(12) United States Patent
Ross

(10) Patent No.: US 12,522,992 B1
(45) Date of Patent: Jan. 13, 2026

(54) AUTOMATIC DOG WASTE PICK UP TOOL

(71) Applicant: Amin Ross, New York, NY (US)

(72) Inventor: Amin Ross, New York, NY (US)

(*) Notice: Subject to any disclaimer, the term of this patent is extended or adjusted under 35 U.S.C. 154(b) by 919 days.

(21) Appl. No.: 17/740,491

(22) Filed: May 10, 2022

(51) Int. Cl.
*E01H 1/12* (2006.01)

(52) U.S. Cl.
CPC ... *E01H 1/1206* (2013.01); *E01H 2001/1226* (2013.01)

(58) Field of Classification Search
CPC .............................. E01H 1/1206; E01H 1/1213
See application file for complete search history.

(56) References Cited

U.S. PATENT DOCUMENTS

| | | | |
|---|---|---|---|
| 4,119,337 A | 10/1978 | Sherhandt | |
| 6,641,188 B2 | 11/2003 | Arceo | |
| 7,080,863 B2 | 7/2006 | Cappellano | |
| 7,261,347 B2 | 8/2007 | Krieger | |
| 7,628,431 B2 | 12/2009 | Evans | |
| 8,550,511 B2 | 10/2013 | Baars | |
| 9,228,307 B2 | 1/2016 | Dixit | |
| 9,528,233 B2 | 12/2016 | Parazynski | |
| D802,229 S | 11/2017 | Rouayroux | |
| 2012/0304406 A1* | 12/2012 | Kirby | E01H 1/1206 294/1.3 |

FOREIGN PATENT DOCUMENTS

CA  2623845  2/2009

* cited by examiner

Primary Examiner — Daniel Jeremy Leeds
(74) Attorney, Agent, or Firm — Kyle A. Fletcher, Esq.

(57) ABSTRACT

The automatic dog waste pick-up tool is a tool. The automatic dog waste pick-up tool is an electrically powered device. The automatic dog waste pick-up tool picks up the elimination of a companion animal from a surface. The automatic dog waste pick-up tool transports the collected elimination to a waste bag in preparation for disposal. The automatic dog waste pick-up tool comprises a collection structure, a disinfection structure, and a control circuit. The disinfection structure and the control circuit mount on the collection structure. The collection structure collects the elimination. The disinfection structure discharges a disinfectant onto the surface after the elimination has been collected. The control circuit controls the operation of the collection structure and the disinfection structure.

12 Claims, 6 Drawing Sheets

US 12,522,992 B1

AUTOMATIC DOG WASTE PICK UP TOOL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of hand implements for picking up animal eliminations. (E01H1/1206)

SUMMARY OF INVENTION

The automatic dog waste pick-up tool is a tool. The automatic dog waste pick-up tool is an electrically powered device. The automatic dog waste pick-up tool picks up the elimination of a companion animal from a surface. The automatic dog waste pick-up tool transports the collected elimination to a waste bag in preparation for disposal. The automatic dog waste pick-up tool comprises a collection structure, a disinfection structure, and a control circuit. The disinfection structure and the control circuit mount on the collection structure. The collection structure collects the elimination. The disinfection structure discharges a disinfectant onto the surface after the elimination has been collected. The control circuit controls the operation of the collection structure and the disinfection structure.

These together with additional objects, features and advantages of the automatic dog waste pick-up tool will be readily apparent to those of ordinary skill in the art upon reading the following detailed description of the presently preferred, but nonetheless illustrative, embodiments when taken in conjunction with the accompanying drawings.

In this respect, before explaining the current embodiments of the automatic dog waste pick-up tool in detail, it is to be understood that the automatic dog waste pick-up tool is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the automatic dog waste pick-up tool.

It is therefore important that the claims be regarded as including such equivalent construction insofar as they do not depart from the spirit and scope of the automatic dog waste pick-up tool. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
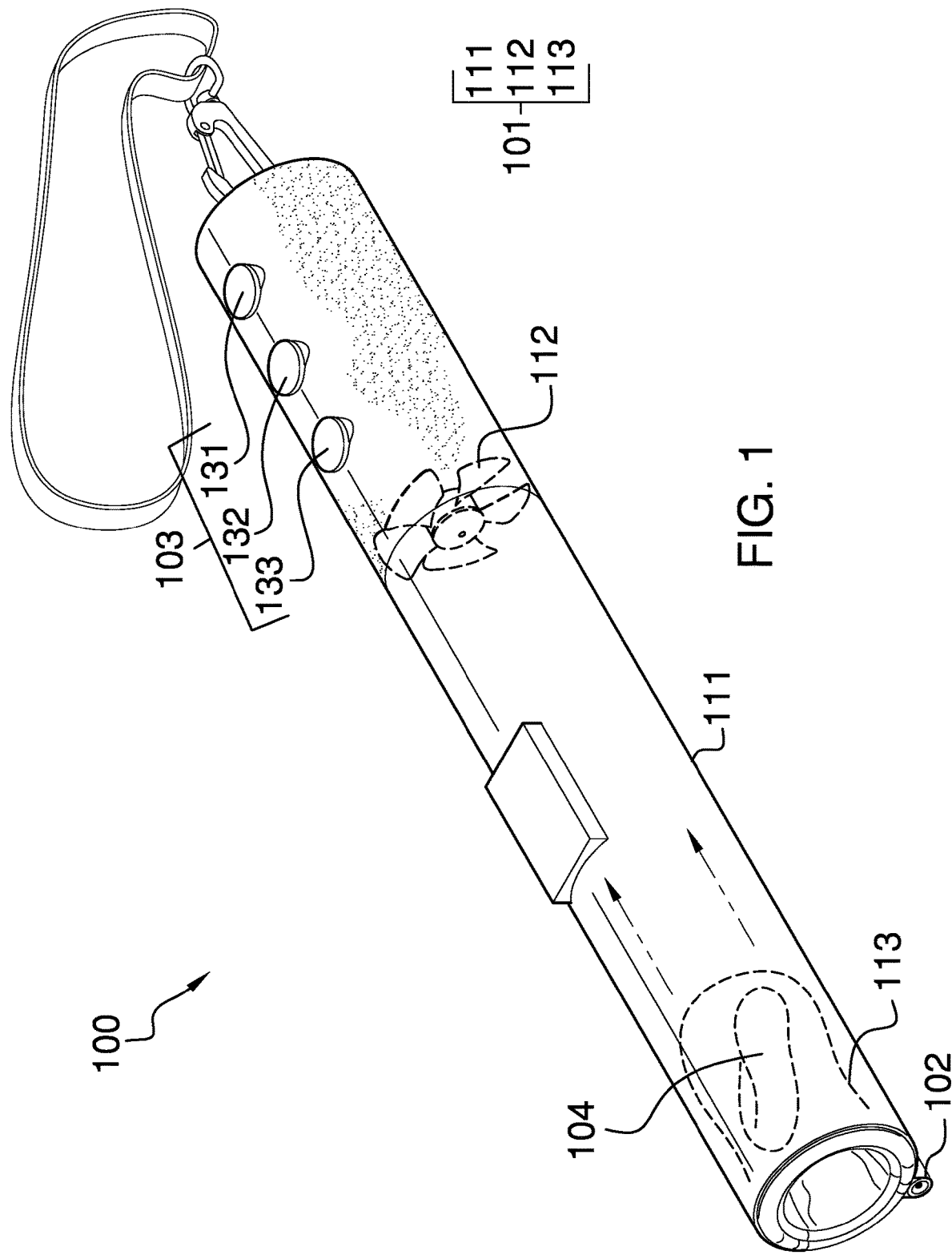
FIG. 1 is a perspective view of an embodiment of the disclosure.
Figure 2:
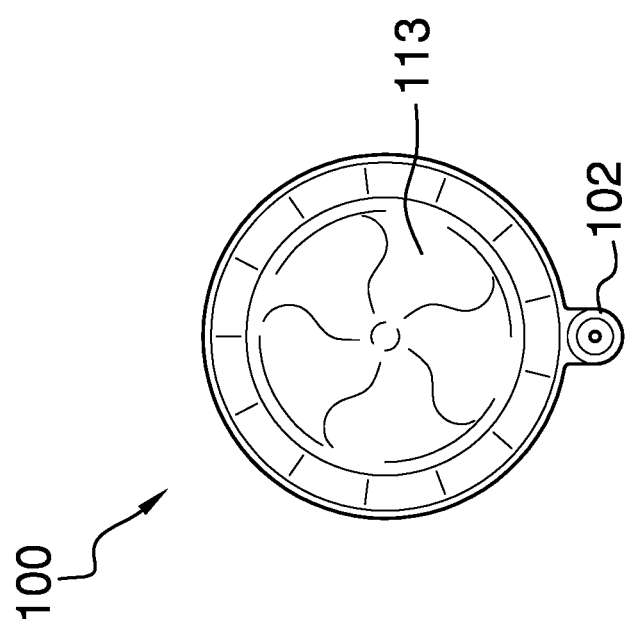
FIG. 2 is a front view of an embodiment of the disclosure.
Figure 3:
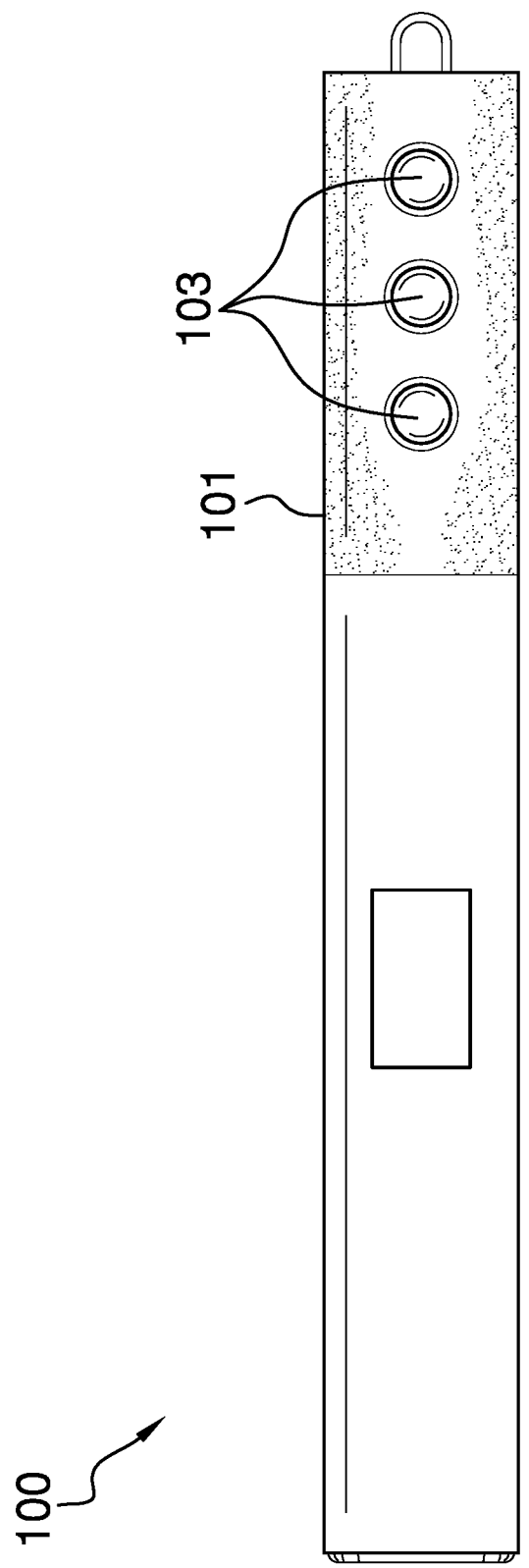
FIG. 3 is a top view of an embodiment of the disclosure.
Figure 4:
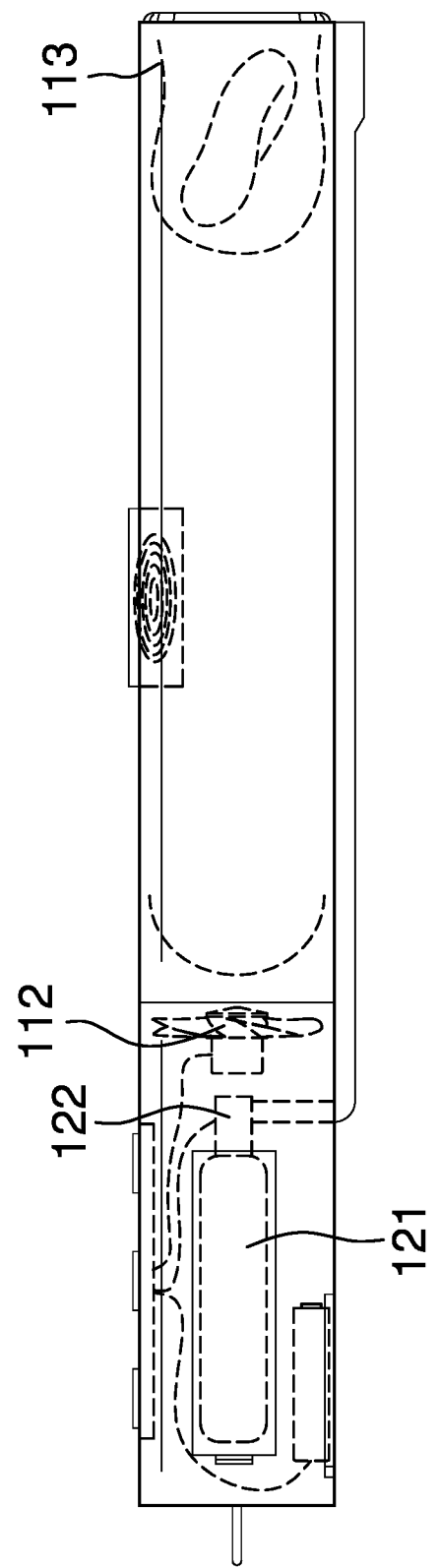
FIG. 4 is a side view of an embodiment of the disclosure.
Figure 5:
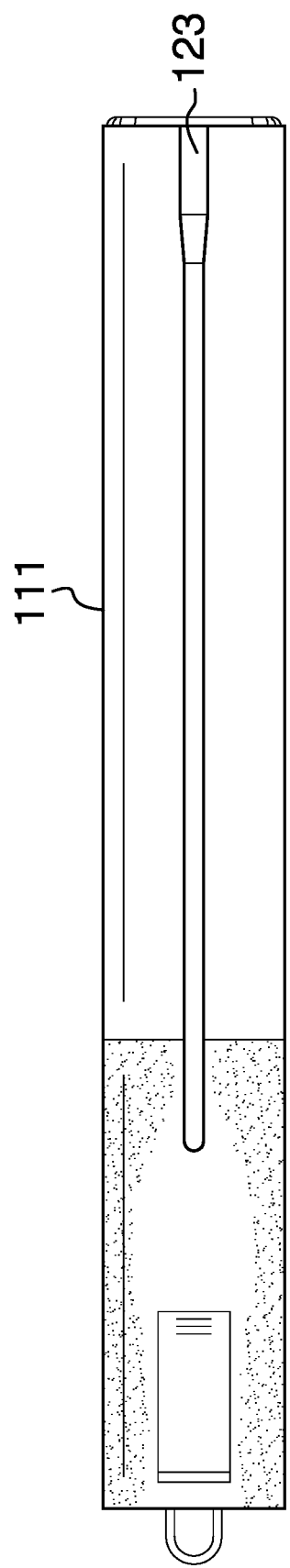
FIG. 5 is a bottom view of an embodiment of the disclosure.
Figure 6:
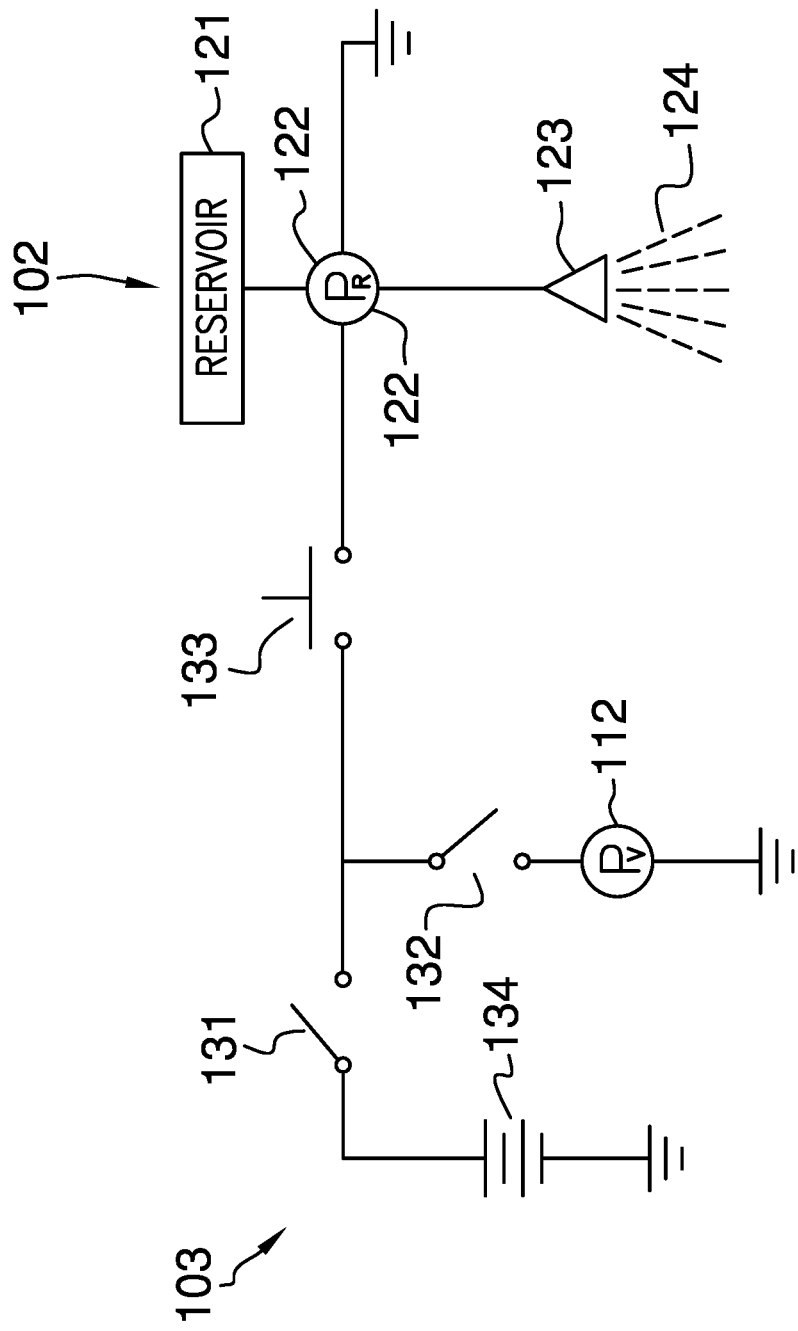
FIG. 6 is a schematic view of an embodiment of the disclosure.

Detailed reference will now be made to one or more potential embodiments of the disclosure, which are illustrated in FIGS. 1 through 6.

The automatic dog waste pick-up tool 100 (hereinafter invention) is a tool. The invention 100 is an electrically powered device. The invention 100 picks up the elimination 104 of a companion animal from a surface. The invention 100 transports the collected elimination 104 to a waste bag 113 in preparation for disposal. The invention 100 comprises a collection structure 101, a disinfection structure 102, and a control circuit 103. The disinfection structure 102 and the control circuit 103 mount on the collection structure 101. The collection structure 101 collects the elimination 104. The disinfection structure 102 discharges a disinfectant onto the surface after the elimination 104 has been collected. The control circuit 103 controls the operation of the collection structure 101 and the disinfection structure 102.

The elimination 104 is a solid phase discharge from the companion animal. The elimination 104 and the companion animal are defined elsewhere in this disclosure.

The collection structure 101 forms the housing of the invention 100. The collection structure 101 is a rigid structure. The disinfection structure 102 and the control circuit 103 mount on the collection structure 101. The collection structure 101 electrically connects to the control circuit 103. The control circuit 103 controls the operation of the collection structure 101. The control circuit 103 provides the electric energy necessary to allow the collection structure 101 to collect the elimination 104 of the companion animal. The collection structure 101 further contains the structures necessary to collect the elimination 104 of the companion animal. The collection structure 101 is formed with all apertures and form factors necessary to allow the collection structure 101 to accommodate the use and operation of the disinfection structure 102 and the control circuit 103. The collection structure 101 comprises a housing structure 111, a vacuum pump 112, and a waste bag 113. The vacuum pump 112 and the waste bag 113 mount on the housing structure 111.

The housing structure 111 is a rigid structure. The housing structure 111 is a prism shaped structure. The housing structure 111 has a tube shape. The disinfection structure 102 and the control circuit 103 mount on the housing structure 111. The housing structure 111 contains the vacuum pump 112 and the waste bag 113. The housing structure 111 is formed with all apertures and form factors necessary to allow the housing 9 structure 111 to accommodate the use and operation of the vacuum pump 112 and the waste bag 113.

The vacuum pump 112 is a mechanical device. The vacuum pump 112 is electrically powered. The vacuum pump 112 electrically connects to the control circuit 103. The control circuit 103 controls the operation of the vacuum pump 112. The control circuit 103 provides the electric energy necessary to operate the vacuum pump 112. The vacuum pump 112 generates a pressure differential that creates a vacuum at an open congruent end of the tube structure of the housing structure 111. The vacuum generated by the vacuum pump 112 creates a suction that draws the elimination 104 of the companion animal into the waste bag 113.

The waste bag 113 is a trash bag. The trash bag is defined elsewhere in this disclosure. The waste bag 113 receives the elimination 104 of the companion animal. The waste bag 113 stores the elimination 104 in anticipation of subsequent disposal. The waste bag 113 mounts on a congruent end of the tube structure of the housing structure 111. The suction generated by the vacuum pump 112 is oriented such that the vacuum pump 112 draws the elimination 104 into the waste bag 113.

The disinfection structure 102 is a fluid delivery device. The disinfection structure 102 contains a disinfectant solution 124. The disinfection structure 102 discharges the disinfectant solution 124. The disinfection structure 102 disinfects the surface from which the elimination 104 of the companion animal has been removed. The disinfection structure 102 electrically connects to the control circuit 103. The control circuit 103 controls the operation of the disinfection structure 102. The disinfection structure 102 comprises a reservoir 121, a reservoir 121 pump 122, and a spray nozzle 123. The reservoir 121, the reservoir 121 pump 122, and the spray nozzle 123 are fluidically interconnected. The reservoir 121 further comprises a disinfectant solution 124. The disinfectant solution 124 is stored in the reservoir 121.

The reservoir 121 is a fluid containment structure. The reservoir 121 is defined elsewhere in this disclosure. The reservoir 121 forms a fluidic connection with the reservoir 121 pump 122. The reservoir 121 stores the disinfectant solution 124 until the disinfectant solution 124 is drawn out of the reservoir 121 by the reservoir 121 pump 122. The disinfectant solution 124 is a fluid phase solution. The disinfectant solution 124 is a pharmacologically active media. The disinfectant solution 124 is applied to the surface on which the elimination 104 of the companion animal was resting. The disinfectant solution 124 is formed from a chemical that destroys or inhibits the biochemical activities of pathogenic microorganisms.

The reservoir 121 pump 122 is a pump. The reservoir 121 pump 122 forms a fluidic connection with the reservoir 121. The reservoir 121 pump 122 forms a fluidic connection with the spray nozzle 123. The reservoir 121 pump 122 pumps the disinfectant solution 124 from the reservoir 121 to the spray nozzle 123. The reservoir 121 pump 122 provides the motive forces necessary to discharge the disinfectant solution 124 from the spray nozzle 123.

The spray nozzle 123 is the discharge port of the disinfection structure 102. The spray nozzle 123 discharges the disinfectant solution 124 as a spray. The spray nozzle 123 is defined elsewhere in this disclosure.

The control circuit 103 is an electric circuit. The control circuit 103 electrically connects to the vacuum pump 112 of the collection structure 101. The control circuit 103 controls the operation of the vacuum pump 112. The control circuit 103 provides the electric energy necessary to operate the vacuum pump 112. The control circuit 103 electrically connects to the reservoir 121 pump 122 of the disinfection structure 102. The control circuit 103 controls the operation of the reservoir 121 pump 122. The control circuit 103 provides the electric energy necessary to operate the reservoir 121 pump 122. The control circuit 103 comprises a master switch 131, a vacuum switch 132, a reservoir 121 switch 133, and a battery 134. The master switch 131, the vacuum switch 132, the reservoir 121 switch 133, and the battery 134 are electrically interconnected.

The master switch 131 is an electric circuit element. The master switch 131 is a maintained switch. The master switch 131 controls the flow of electric energy from the battery 134 into the vacuum pump 112. The master switch 131 controls the flow of electric energy from the battery 134 into the reservoir 121 pump 122. The master switch 131 effectively forms a "power switch" that enables and inhibits the overall operation of the invention 100.

The vacuum switch 132 is an electric circuit element. The vacuum switch 132 is a maintained switch. The vacuum switch 132 controls the flow of electric energy from the master switch 131 through the vacuum pump 112. The vacuum switch 132 initiates the operation of the vacuum pump 112 when the master switch 131 simultaneously enables the operation of the invention 100. The vacuum switch 132 discontinues the operation of the vacuum pump 112 when the master switch 131 simultaneously enables the operation of the invention 100. The vacuum switch 132 does not influence the operation of the vacuum pump 112 when the master switch 131 disables the operation of the invention 100.

The reservoir 121 switch 133 is an electric circuit element. The reservoir 121 switch 133 is a maintained switch. The reservoir 121 switch 133 controls the flow of electric energy from the master switch 131 through the reservoir 121 pump 122. The reservoir 121 switch 133 initiates the operation of the reservoir 121 pump 122 when the master switch 131 simultaneously enables the operation of the invention 100. The reservoir 121 switch 133 discontinues the operation of the reservoir 121 pump 122 when the master switch 131 simultaneously enables the operation of the invention 100. The reservoir 121 switch 133 does not influence the operation of the reservoir 121 pump 122 when the master switch 131 disables the operation of the invention 100.

The battery 134 is an electrochemical device. The battery 134 converts chemical potential energy into electrical energy. The battery 134 provides the electrical energy necessary to operate the invention 100.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Bag: As used in this disclosure, a bag is a container made of a flexible material. The bag has a single opening which allows the bag to receive the items to be contained.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Clean: As used in this disclosure, the term clean refers to an object without dirt, unwanted markings, or undesirable pathogens. When referring to a surface, the term clean can also refer to removing unwanted objects from the surface. The term cleaning refers to the action of making an object clean.

Cleaning Agent: As used in this disclosure, a cleaning agent is a chemical compound used to remove pathogens, dirt, and detritus from a surface.

Cleaning Solution: As used in this disclosure, a cleaning solution is a chemical solution that contains a solvent used to dissolve a cleaning agent.

Companion Animal: As used in this disclosure, a companion animal is a domesticated animal that is maintained primarily for companionship. A companion animal is often referred to as a pet.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disinfectant: As used in this disclosure, a disinfectant is a chemical that destroys or inhibits the biochemical activities of pathogenic microorganisms.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk.

In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Elimination: As used in this disclosure, an elimination refers to a solid phase discharge from a biological entity.

Excretion: As used in this disclosure, an excretion refers to a liquid phase discharge from a biological entity.

Exterior: As used in this disclosure, the exterior is used as a relational term that implies that an object is not contained within the boundary of a structure or a space.

Fan: As used in this disclosure, a fan is a pump that moves a gas.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Housing: As used in this disclosure, a housing is a rigid structure that encloses and protects one or more devices.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Liquid: As used in this disclosure, a liquid refers to a state (phase) of matter that is fluid and that maintains, for a given pressure, a fixed volume that is independent of the volume of the container.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Maintained Switch: As used in this disclosure, a maintained switch is a switch that maintains the position that was set in the most recent switch actuation. A maintained switch works in an opposite manner to a momentary switch.

Momentary Switch: As used in this disclosure, a momentary switch is a biased switch in the sense that the momentary switch has a baseline position that only changes when the momentary switch is actuated (for example when a pushbutton switch is pushed or a relay coil is energized). The momentary switch then returns to the baseline position once the actuation is completed. This baseline position is called the "normal" position. For example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

Normally Closed: As used in this disclosure, normally closed refers to an externally controlled electrical switching device, such as a relay or a momentary switch, which passes electric current when the externally controlled electrical switching device is in an unpowered state. In a common alternate usage, the term normally closed valve is taken to mean that the normally closed valve prevents the flow of fluid through the normally closed valve when the normally closed valve is in an unpowered state.

Normally Open: As used in this disclosure, normally open refers to an externally controlled electrical switching device, such as a relay or a momentary switch, which does not pass electric current when the externally controlled electrical switching device is in an unpowered state. In a common alternate usage, the term normally open valve is taken to mean that the normally open valve allows the flow of fluid through the normally open valve when the normally open valve is in an unpowered state.

Nozzle: As used in this disclosure, a nozzle is a device that receives fluid under pressure and releases the fluid in a controlled manner into an environment. An intake nozzle refers to a device that generates a negative pressure within the nozzle structure such that the intake nozzle draws a fluid into the intake nozzle from a reservoir.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Pharmacologically Active Media: As used in this disclosure, a pharmacologically active media refers to a chemical substance that has a biochemical or physiological effect on a biological organism.

Phase: As used in this disclosure, phase refers to the state of the form of matter. The common states of matter are solid, liquid, gas, and plasma.

Primary Shape: As used in this disclosure, the primary shape refers to a description of the rough overall geometric shape of an object that is assembled from multiple components or surfaces.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Pump: As used in this disclosure, a pump is a mechanical device that uses suction or pressure to raise or move fluids, compress fluids, or force a fluid into an inflatable object.

Within this disclosure, a compressor refers to a pump that is dedicated to compressing a fluid or placing a fluid under pressure.

Reservoir: As used in this disclosure, a reservoir refers to a container or containment system that is configured to store a fluid.

Rigid Structure: As used in this disclosure, a rigid structure is a solid structure formed from an inelastic material that resists changes in shape. A rigid structure will permanently deform as it fails under a force. See bimodal flexible structure.

Roughly: As used in this disclosure, roughly refers to a comparison between two objects. Roughly means that the difference between one or more parameters of the two compared objects are not significantly different.

Solid: As used in this disclosure, a solid refers to a state (phase) of matter that: 1) has a fixed volume; and, 2) does not flow.

Spray: As used in this disclosure, a spray is a plurality of liquid drops dispersed in a gas.

Spray Nozzle: As used in this disclosure, a spray nozzle is a device that receives liquid under pressure and disperses that liquid into the atmosphere as a spray.

Suction: As used in this disclosure, suction refers to the generation of a vacuum that is used to transport an object.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Tool: As used in this disclosure, a tool is a device, an apparatus, or an instrument that is used to carry out an activity, operation, or procedure. A tool generally comprises a working element and a handle.

Trash Bag: As used in this disclosure, a trash bag is a disposable bag formed from a sheeting that is used to contain trash and other refuse for in a manner suitable for disposal. Trash bags are often used to line a waste container.

Tube: As used in this disclosure, a tube is a hollow cylindrical device that is used for transporting liquids and gases. In this disclosure, the terms inner diameter and outer diameter are used as they would be used by those skilled in the plumbing arts. The line that connects the center of the first base of the cylinder to the center of the second base of the cylinder is referred to as the axis of the cylinder or the centerline of the tube. When two tubes share the same centerline they are said to be aligned. When the centerlines of two tubes are perpendicular to each other, the tubes are said to be perpendicular to each other. The face of the tube corresponds to the face of a solid cylinder: the face of the cylinder incorporates what is left of the surface area of the cylinder after the surface area of the faces are excluded.

Vacuum: As used in this disclosure, vacuum is used to describe a first space that contains gas at a reduced gas pressure relative to the gas pressure of a second space. If the first space and the second space are connected together, this pressure differential will cause gas from the second space to move towards the first space until the pressure differential is eliminated.

Vacuum Cleaner: As used in this disclosure, a vacuum cleaner is a domestic appliance that generates a suction used to remove debris from a surface. A "wet-dry vacuum" refers to a vacuum cleaner that: a) passes the removed debris through a water reservoir; and/or, b) is capable of removing fluid from a surface.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Working Element: As used in this disclosure, the working element of a tool is the physical element on the tool that performs the actual activity, operation, or procedure the tool is designed to perform. For example, the cutting edge of a blade is the working element of a knife.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:
1. An automatic dog waste pick-up tool comprising
 a collection structure, a disinfection structure, and a control circuit;
 wherein the disinfection structure and the control circuit mount on the collection structure;
 wherein the automatic dog waste pick-up tool picks up the elimination of a companion animal;
 wherein the automatic dog waste pick-up tool transports the collected elimination to a waste bag;
 wherein the collection structure collects the elimination;
 wherein the disinfection structure discharges a disinfectant onto the surface after the elimination has been collected;
 wherein the control circuit controls the operation of the collection structure and the disinfection structure;
 wherein the collection structure comprises a housing structure, a vacuum pump, and a waste bag;
 wherein the vacuum pump and the waste bag mount on the housing structure;

wherein suction generated by the vacuum pump is oriented such that the vacuum pump draws the elimination into the waste bag.

2. The automatic dog waste pick-up tool according to claim 1 wherein the automatic dog waste pick-up tool is an electrically powered device.

3. The automatic dog waste pick-up tool according to claim 1
wherein the collection structure forms the housing of the automatic dog waste pick-up tool;
wherein the collection structure is a rigid structure.

4. The automatic dog waste pick-up tool according to claim 3
wherein the collection structure electrically connects to the control circuit;
wherein the control circuit controls the operation of the collection structure;
wherein the control circuit provides the electric energy necessary to allow the collection structure to collect the elimination of the companion animal.

5. The automatic dog waste pick-up tool according to claim 4
wherein the disinfection structure is a fluid delivery device;
wherein the disinfection structure contains a disinfectant solution;
wherein the disinfection structure discharges the disinfectant solution;
wherein the disinfection structure electrically connects to the control circuit;
wherein the control circuit controls the operation of the disinfection structure.

6. The automatic dog waste pick-up tool according to claim 5
wherein the disinfection structure comprises a reservoir, a reservoir pump, and a spray nozzle;
wherein the reservoir, the reservoir pump, and the spray nozzle are fluidically interconnected;
wherein the reservoir further comprises a disinfectant solution;
wherein the disinfectant solution is stored in the reservoir.

7. The automatic dog waste pick-up tool according to claim 6
wherein the control circuit is an electric circuit;
wherein the control circuit electrically connects to the vacuum pump of the collection structure;
wherein the control circuit controls the operation of the vacuum pump;
wherein the control circuit provides the electric energy necessary to operate the vacuum pump;
wherein the control circuit electrically connects to the reservoir pump of the disinfection structure;
wherein the control circuit controls the operation of the reservoir pump;
wherein the control circuit provides the electric energy necessary to operate the reservoir pump.

8. The automatic dog waste pick-up tool according to claim 7
wherein the control circuit comprises a master switch, a vacuum switch, a reservoir switch, and a battery;
wherein the master switch, the vacuum switch, the reservoir switch, and the battery are electrically interconnected.

9. The automatic dog waste pick-up tool according to claim 8
wherein the housing structure is a rigid structure;
wherein the housing structure has a tube shape;
wherein the disinfection structure and the control circuit mount on the housing structure.

10. The automatic dog waste pick-up tool according to claim 9
wherein the vacuum pump is a mechanical device;
wherein the vacuum pump is electrically powered;
wherein the vacuum pump electrically connects to the control circuit;
wherein the control circuit controls the operation of the vacuum pump;
wherein the control circuit provides the electric energy necessary to operate the vacuum pump;
wherein the waste bag is a trash bag;
wherein the waste bag receives the elimination of the companion animal;
wherein the waste bag stores the elimination in anticipation of subsequent disposal;
wherein the waste bag mounts on a congruent end of the tube structure of the housing structure.

11. The automatic dog waste pick-up tool according to claim 10
wherein the reservoir is a fluid containment structure;
wherein the reservoir forms a fluidic connection with the reservoir pump;
wherein the reservoir pump is a pump;
wherein the reservoir pump forms a fluidic connection with the spray nozzle;
wherein the reservoir pump pumps the disinfectant solution from the reservoir to the spray nozzle;
wherein the spray nozzle is the discharge port of the disinfection structure;
wherein the spray nozzle discharges the disinfectant solution as a spray.

12. The automatic dog waste pick-up tool according to claim 11
wherein the master switch is an electric circuit element;
wherein the master switch is a maintained switch;
wherein the master switch controls the flow of electric energy from the battery into the vacuum pump;
wherein the master switch controls the flow of electric energy from the battery into the reservoir pump;
wherein the vacuum switch is an electric circuit element;
wherein the vacuum switch is a maintained switch;
wherein the vacuum switch controls the flow of electric energy from the master switch through the vacuum pump;
wherein the reservoir switch is an electric circuit element;
wherein the reservoir switch is a maintained switch;
wherein the reservoir switch controls the flow of electric energy from the master switch through the reservoir pump;
wherein the battery is an electrochemical device;
wherein the battery converts chemical potential energy into electrical energy;
wherein the battery provides the electrical energy necessary to operate the automatic dog waste pick-up tool.

* * * * *